United States Patent
Kempers et al.

(10) Patent No.: US 11,300,056 B2
(45) Date of Patent: Apr. 12, 2022

(54) STARTING ALTERNATIVES FOR GAS TURBINE ENGINES

(71) Applicant: Rolls-Royce Corporation, Indianapolis, IN (US)

(72) Inventors: Adam Kempers, Indianapolis, IN (US); Jeremy Gallagher, Carmel, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 286 days.

(21) Appl. No.: 16/555,859

(22) Filed: Aug. 29, 2019

(65) Prior Publication Data
US 2021/0062720 A1    Mar. 4, 2021

(51) Int. Cl.
*F02C 7/275*    (2006.01)

(52) U.S. Cl.
CPC .................... *F02C 7/275* (2013.01)

(58) Field of Classification Search
CPC .... F02C 7/32; F02C 7/36; F02C 7/277; F02C 7/275
See application file for complete search history.

(56) References Cited

U.S. PATENT DOCUMENTS

| | | | |
|---|---|---|---|
| 6,704,625 B2* | 3/2004 | Albero | B64D 13/06 701/3 |
| 9,225,220 B2 | 12/2015 | Blewett | |
| 2006/0260323 A1* | 11/2006 | Moulebhar | F02C 7/268 60/793 |
| 2007/0151258 A1* | 7/2007 | Gaines | F02K 3/06 60/792 |
| 2010/0024434 A1* | 2/2010 | Moore | F02C 7/32 60/788 |
| 2014/0093399 A1* | 4/2014 | Pratelli | F04B 35/00 417/53 |
| 2017/0328282 A1* | 11/2017 | Jensen | F02C 7/32 |

FOREIGN PATENT DOCUMENTS

| | | |
|---|---|---|
| EP | 3361073 A1 | 8/2018 |
| EP | 3415729 A1 | 12/2018 |

* cited by examiner

*Primary Examiner* — Todd E Manahan
*Assistant Examiner* — Thuyhang N Nguyen
(74) *Attorney, Agent, or Firm* — Crowell & Moring LLP

(57) ABSTRACT

A method of starting a turbine engine utilizing multiple components. The turbine engine may comprise a gearbox coupled to a spool of the turbine engine via an output shaft. A first starter may be coupled to the gearbox via an input shaft. A first accessory may be coupled to the gearbox via another input shaft. The rotation of the output shaft of the gearbox may be coupled to the rotation of the spool. The rotation of each of the first starter and first accessory may be coupled to the rotation of the respective input shaft of the gearbox. The method may comprise applying a first application of power to one of the first starter and the first accessory and applying a second application of power to the other of the first accessory and the first starter.

20 Claims, 6 Drawing Sheets

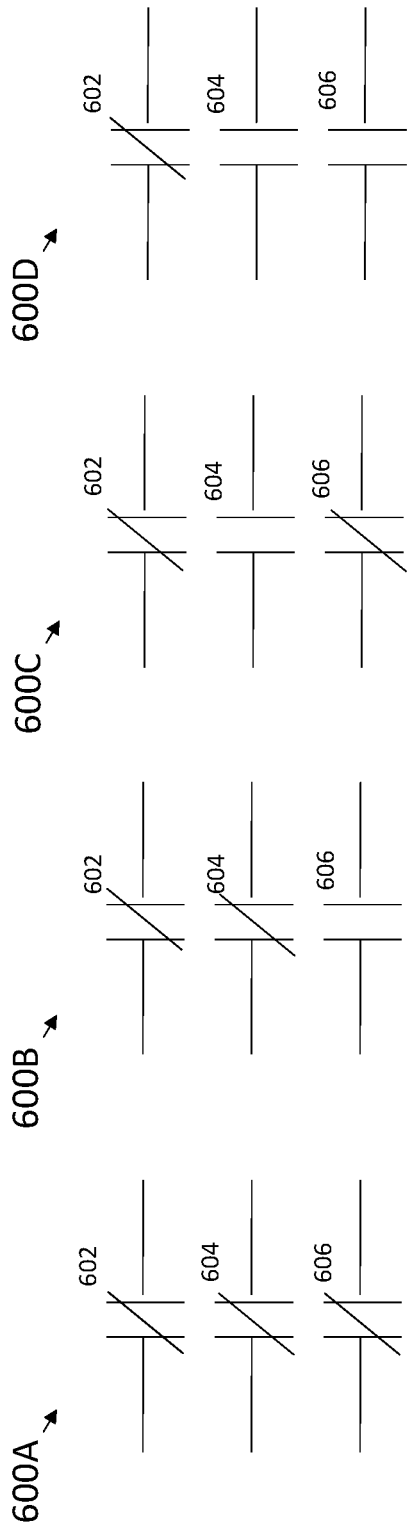

STARTING ALTERNATIVES FOR GAS TURBINE ENGINES

BACKGROUND

Turbine engines extract energy to perform work by compressing a working fluid, mixing a fuel into the compressed working fluid, igniting the fuel/fluid mixture, and expanding the combusted fuel/fluid mixture through a turbine. When a turbine is operating, a portion of the extracted energy is provided as the work input to the engine's compressor, thereby making the operation of the turbine self-sustaining Prior to reaching this self-sustaining point, the work input to drive the compressor must be supplied by some system other than the turbine(s). These other systems often incorporate a starter—such as an electric starter or an air turbine starter—that provides the motive force to turn the engine compressor, thereby providing an airflow to the turbine that can, eventually, extract and provide enough work output to drive the compressor. Such starters are often connected to the spool housing the compressor through gearboxes and shafting.

SUMMARY

In accordance with some embodiments, a method of starting a turbine engine is provided. The turbine engine may comprise a gearbox coupled to a spool of the turbine engine via an output shaft. A first starter may be coupled to the gearbox via an input shaft. A first accessory may be coupled to the gearbox via another input shaft. The rotation of the output shaft of the gearbox may be coupled to the rotation of the spool. The rotation of each of the first starter and first accessory may be coupled to the rotation of the respective input shaft of the gearbox. The method may comprise applying a first application of power to one of the first starter and the first accessory and applying a second application of power to the other of the first accessory and the first starter. The first application of power may cause rotation of an input shaft of the gearbox that is coupled to one of the first starter and first accessory; rotation of the output shaft of the gearbox, where the rotation of the output shaft is caused by the rotation of the input shaft; and, rotation of the turbine engine spool. The second application of power to the other of the first accessory and first starter may cause increased rotational speed of the turbine engine spool beyond that achieved by the first application of power.

In accordance with some embodiments, a method of starting a turbine engine is provided. The turbine engine may comprise a gearbox coupled to a spool of the turbine engine via an output shaft. A starter may be coupled to the gearbox via a first input shaft. A barring motor may be coupled to the gearbox via a second input shaft. The rotation of the output shaft of the gearbox may be coupled to the rotation of the spool. The rotation of each of the starter and the barring motor may be coupled to the rotation of its respective input shaft of the gearbox. The method may comprise applying a first application of power to the barring motor and applying a second application of power to the starter. The first application of power may cause rotation of the second input shaft of the gearbox; rotation of the output shaft of the gearbox, where the rotation of the output shaft is caused by the rotation of the second input shaft; and, rotation of the turbine engine spool. The second application of power to the starter may cause increased rotational speed of the turbine engine spool beyond that achieved by the first application of power.

In accordance with some embodiments, a method of starting a turbine engine is provided. The turbine engine may comprise a gearbox coupled to a spool of the turbine engine via an output shaft. An air turbine starter may be coupled to the gearbox via a first input shaft. A permanent magnet alternator ("PMA") may be coupled to the gearbox via a second input shaft. The rotation of the output shaft of the gearbox may be coupled to the rotation of the spool. The rotation of each of the starter and the PMA may be coupled to the rotation of its respective input shaft of the gearbox. The method may comprise applying a first application of power to the air turbine starter and applying a second application of to the PMA. The first application of power may cause rotation of the first input shaft of the gearbox; rotation of the output shaft of the gearbox, where the rotation of the output shaft is caused by the rotation of the first input shaft; and, rotation of the turbine engine spool. The second application of power to the PMA may cause increased rotational speed of the turbine engine spool beyond that achieved by the first application of power.

BRIEF DESCRIPTION OF THE DRAWINGS

The following will be apparent from elements of the figures, which are provided for illustrative purposes.

FIGS. 6A-6D are a circuit diagrams illustrating the first application of power to various dedicated or augmenting starting components.

Figure 1:
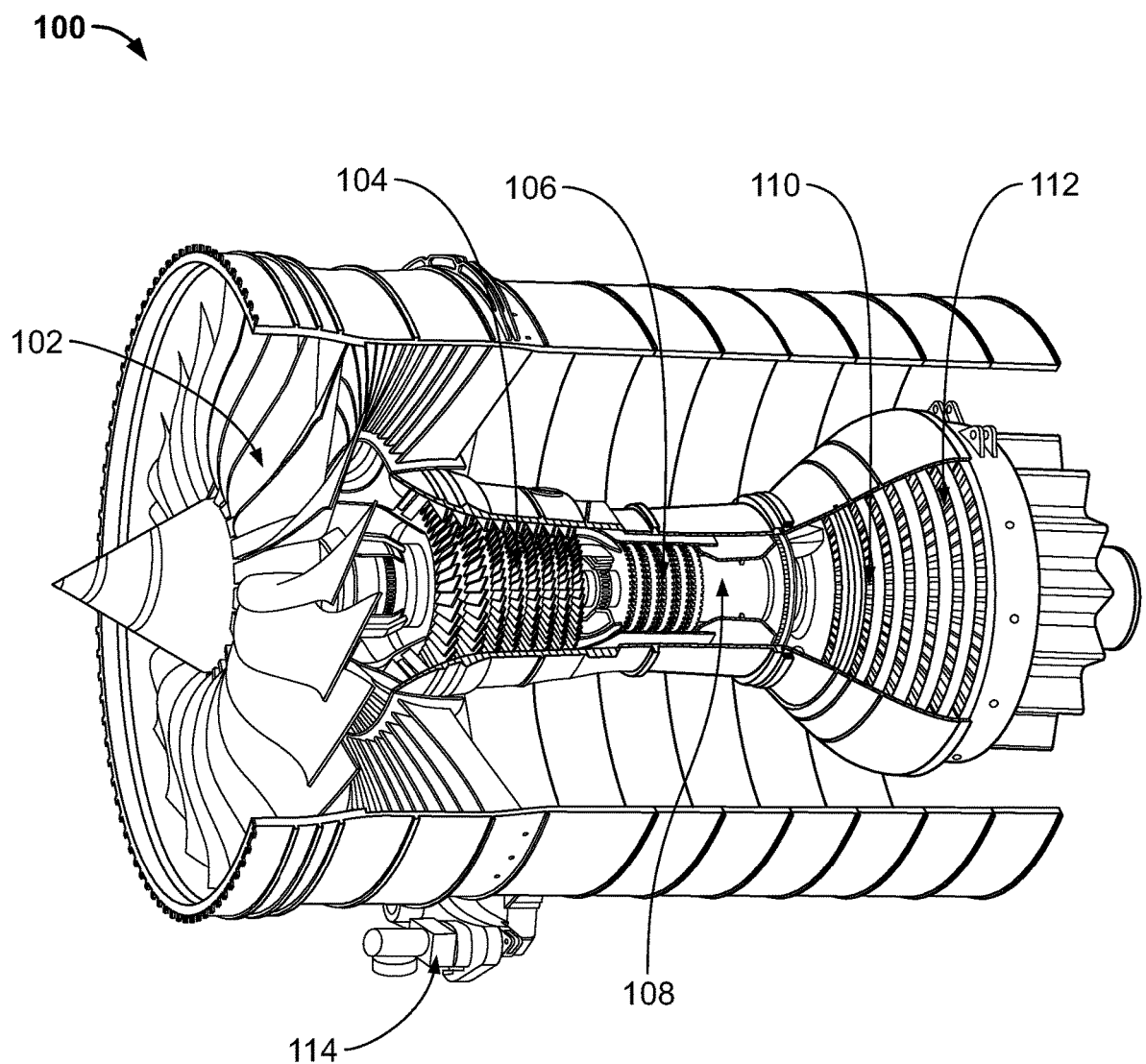
FIG. 1 is perspective view of a turbine engine and an accessory gearbox.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Illustrated in FIG. 1 is a perspective view of a turbine engine 100. The turbine engine 100 may be a gas turbine engine, and may comprise a fan 102, compressor sections 104 and 106, combustor 108, turbine sections 110 and 112, and an accessory gearbox 114. Compressor section 106 and turbine section 110 may each be coupled to a common spool, often known as the high pressure spool. Similarly, compressor section 104 and turbine section 112 may each be coupled to a different common spool, often known as the low pressure spool. Fan 102 is also coupled to the low pressure spool either directly such that fan 102 rotates at the same speed as compressor section 104 and turbine section 112 or through a gear system.

During operation of turbine engine 100, incoming air is pressurized by compressor section 104 and then compressor section 106. The compressed air is then mixed with fuel and ignited in combustor 108. The combusted air/fuel mixture is then expanded through turbine section 110 and turbine section 112. Work is extracted from the combusted air/fuel mixture during its expansion through the turbine sections. The work extracted by turbine section 110 may be used to power compressor section 106 and various accessory loads. These accessory loads may be coupled to the accessory gearbox 114 (see FIG. 2) that is, in turn, coupled to the high pressure spool through gearing and/or shaft work (e.g., output shaft 130 in FIG. 2).

As explained earlier, the above operation is self-sustaining when the work output of the turbine section(s), and in particular turbine section 110, is alone sufficient to drive the compressor section(s), and in particular compressor section 106, such that the incoming air is pressurized so that the air/fuel mixture can be combusted and provided to the turbine sections. Until the operation of the turbine engine 100 is self-sustaining, work must be provided from some component other than turbines to rotate the compressors. These other components are referred to as starters.

Two types of starters are electric starters and air turbine starters (ATS). Both types of starters may be configured to bring a turbine engine 100 from rest to a point of self-sustaining operation. The electric starter converts electrical energy into rotational motion that drives one or more spools of the turbine engine. This electrical power could be supplied by systems onboard an aircraft (e.g., batteries or other electrical power storage devices, or electrical power generators (e.g., an auxiliary power unit (APU), another main turbine engine, etc.)), or systems external to the aircraft (e.g., a starting cart, etc.). An ATS expands a working fluid through a turbine to convert the working fluid energy into rotational motion that drives one or more spools of the turbine engine. The working fluid for an ATS may be supplied by aircraft components (e.g., APU, another main turbine engine, etc.), or systems external to the aircraft (e.g., a starting cart, etc.).

Figure 2:
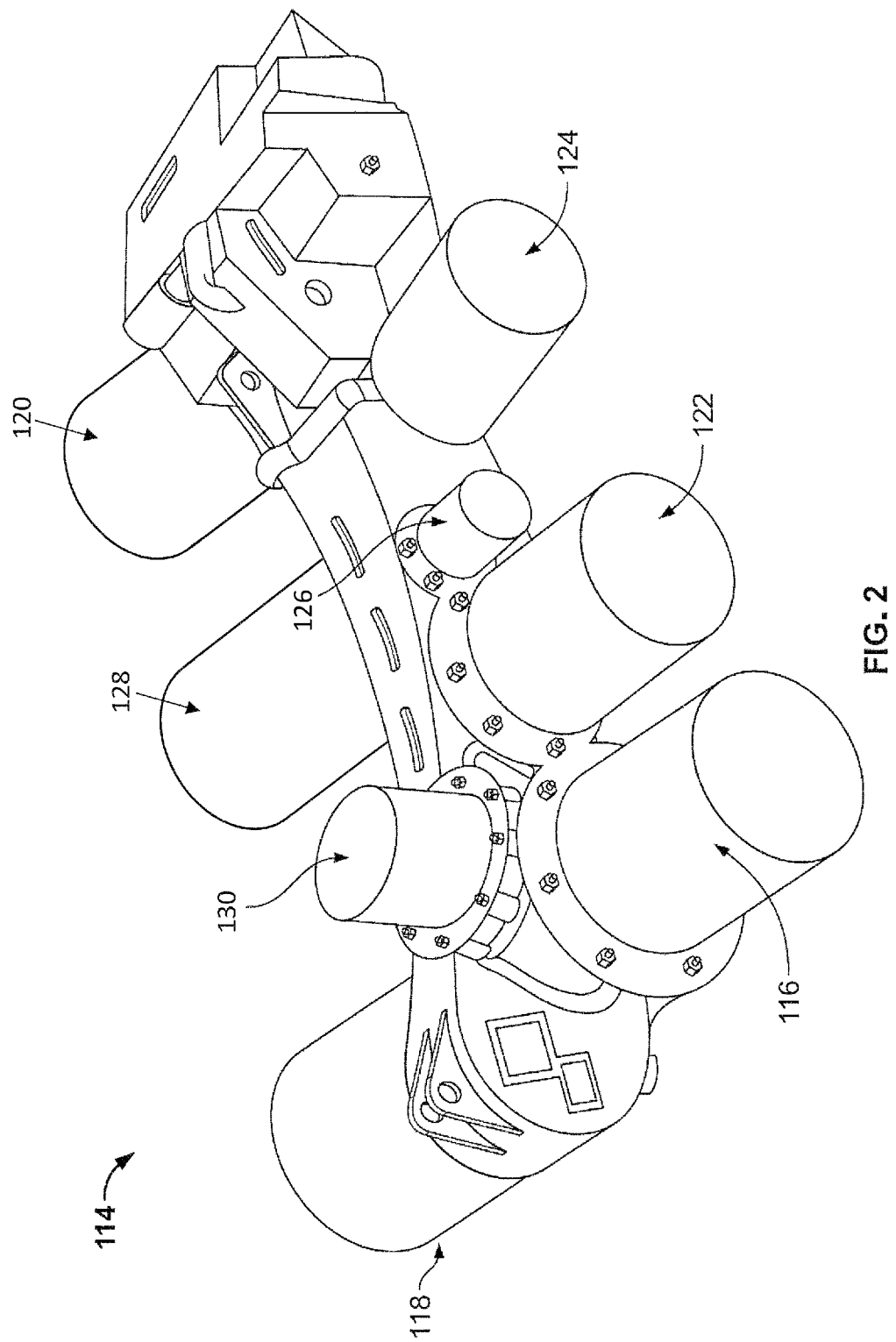
FIG. 2 is a perspective view of the accessory gearbox of FIG. 1.
Figure 3:
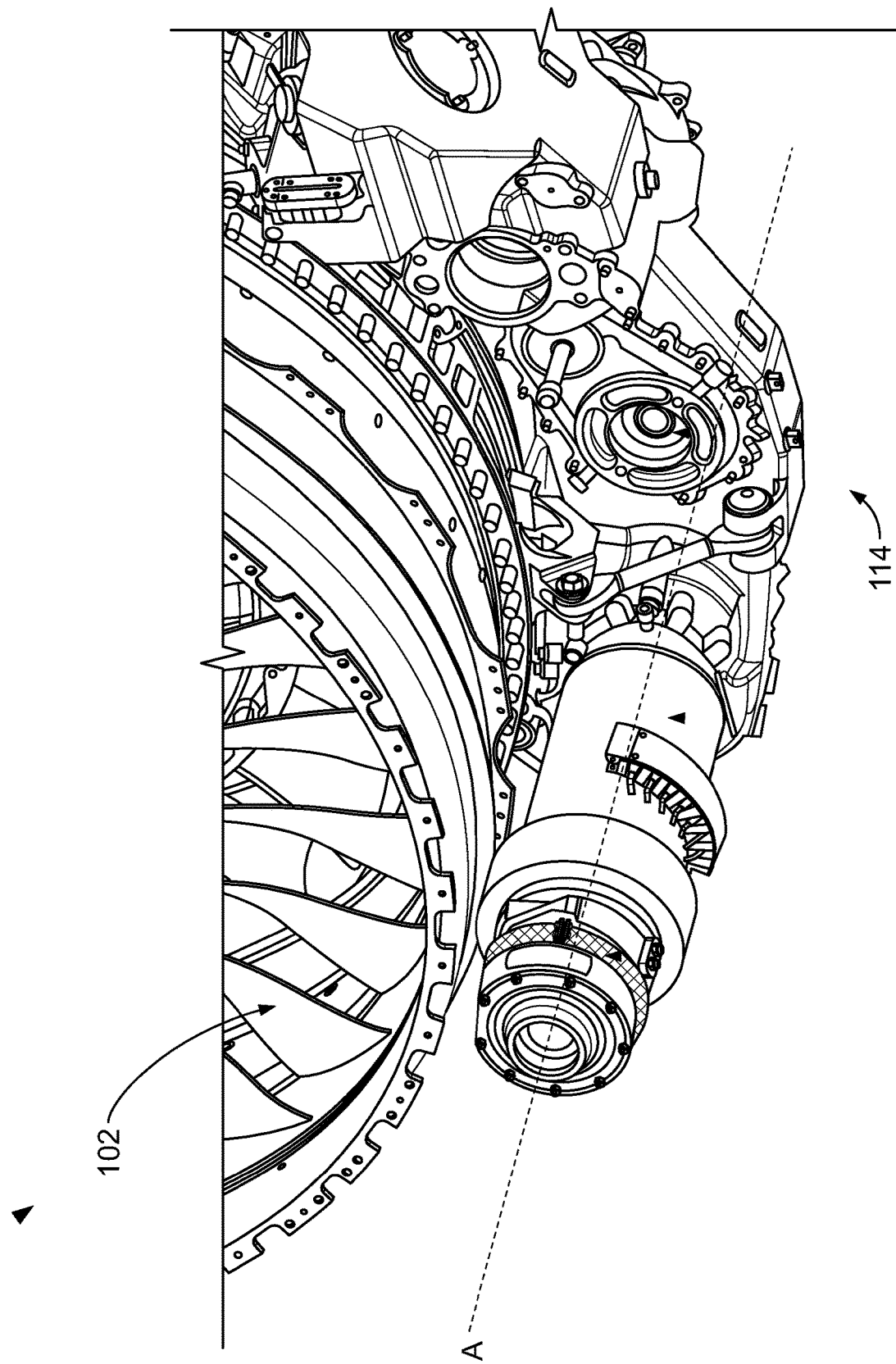
FIG. 3 is a close-up, perspective view of an accessory gearbox and turbine engine in accordance with some embodiments.
Figure 4:
FIG. 4 is a block diagrams of various methods of starting a turbine engine in accordance with some embodiments.

Electric starters and ATS's may be coupled to one or more spools of the turbine engine 100 through an accessory gearbox. FIG. 2 illustrates an accessory gearbox 114. Connected to accessory gearbox 114 are a number of components, including ATS 116, generator 118 (e.g., an integrated drive generator), fuel pump 120, hydraulic pump 122, oil pump 124, and permanent magnet alternator ("PMA") 126. Other components, e.g., a barring motor 128 may also be attached to the accessory gear box 114. In some embodiments, a generator that is supplied with electric power and operated as a motor is referred to as a motor-generator.

In some embodiments, ATS 116 may be replaced by an electric-starter generator ("ESG"). In some embodiments, both an ESG and ATS may be coupled to the accessory gearbox.

The location at which each of these components is coupled to the accessory gearbox 114 is known as a pad. Accessory gearbox pads and their associated internal accessory gearbox components are often designed to accommodate the specific loads of the component that couples to the pad. For example, the pad (and internal accessory gearbox components) to which ATS 116 is coupled is designed to support the high torque load from ATS 116 required to start the turbine engine 100, as well the static and dynamic loads from the structure of ATS 116 (e.g., bending moments). Some components that are mechanically coupled to the gearbox 114 may be selectively coupled using, e.g., a clutch, such that the component can be decoupled when not in use. Decoupling these components also means that ATS 116 is not required to drive these components during the startup sequences. Additionally, ATS 116 may also be equipped with a clutch such that it is rotationally disconnected from the gearbox 114 after the startup sequence is complete.

Several of the components connected to gearbox 114 may be used to create electrical power, or convert electrical power into mechanical work. For example, generator 118 is used to generate electrical power during normal operations. Likewise, a permanent magnet alternator (PMA) 126 generates electrical power, however, this power is used for the engine igniters during the starting sequence.

In accordance with some embodiments, these and other accessory components may be used to assist in starting a turbine engine. For example, one or more of a generator 118, PMA 126, or barring motor may be supplied with and convert electrical energy into a mechanical torque that may be used to assist a starter, whether an air turbine starter, electric starter generator, or other starter, during the startup sequence. By utilizing accessory components, a "dedicated" starter may be made smaller, thereby saving weight not only of the starter but also of associated systems, e.g., ducting and valves used to supply air to an ATS.

Figure 5:
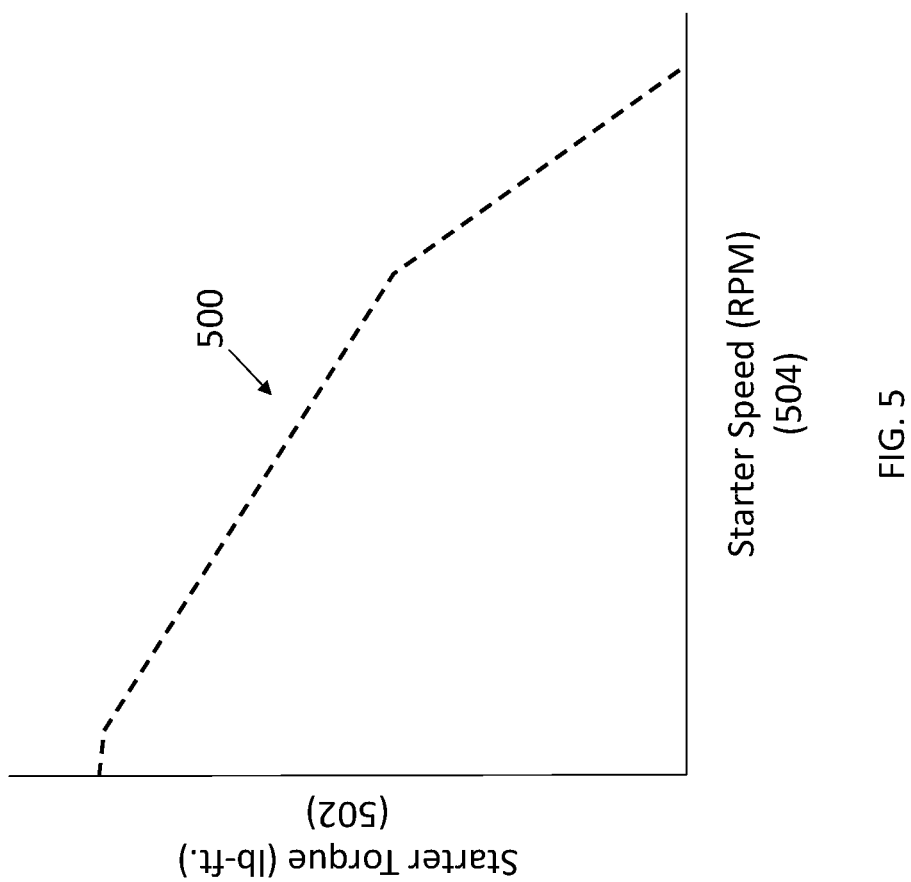
FIG. 5 illustrates starter torque as a function of starter rotational speed.

FIG. 5 illustrates a curve 500 of the starter torque 502 vs. starter speed 504. As shown, starters require higher output torques at lower speeds in order to overcome the inertia of the turbine spool. Therefore, starters are typically sized by this initial torque requirement. Using accessory components to augment the torque of the starter can lead to reduce size of the starter and its associated components as described above.

In accordance with some embodiments, a method 400 of starting a turbine engine is provided. The method may comprise, at block 402, applying a first application of power. This power may be applied via a dedicated starter, for example, an ATS, or to an accessory component, such as a PMA 126, generator 118, or a barring motor. The first application of power causes rotation of an input shaft to the gearbox at block 404, thereby causing initial rotation an output shaft (block 406) and a turbine spool. At block 408, a second application of power is provided to the other of the accessory components and the dedicated starter. This causes a torque to be applied to an input shaft of the gearbox, thereby increasing the torque applied through the gearbox to the turbine. The second application of power causes the turbine spool to increase rotational speed beyond that achieved by the first application of power alone.

It should be understood that the application of power may be electric or mechanical depending on the component. For example, an ATS will be supplied with and convert mechanical energy into rotation of a gearbox input shaft. PMA 126, generator 118, or a barring motor will convert electric power into this rotation.

The above power can be applied in various ways. For example, the first and second applications of power may overlap, or they may not such that each is applied separately. In some embodiments, a third application of power may be supplied to yet another component attached to the gearbox, or it may be reapplied to the component to which the first or second application of power was applied.

In some embodiments, the method further comprises unloading accessories from the accessory gearbox. For example, a mechanical coupled accessory may be decoupled components from the gearbox prior to the start sequence to reduce the drag and inertia of those components that the starting components would need to overcome. Similarly, electrically-powered components can be open-circuited to reduce electric drag, thereby allowing more electric power to be provided to a component that supplements the dedicated starter.

In some embodiments, power is applied to both a dedicated starter and one or more accessory components simultaneously such that the combined torque output of these components overcomes the resting inertia of the turbine spool. In this manner, the starting torque required of the dedicated starter (ATS, ESG, or other) is lowered by the amount of torque provided by the one or more accessory components. With less torque required from the dedicated starter, the dedicated starter and associated systems can be reduced in size.

Aircraft also contain electric power distribution systems. In some embodiments, the electric components coupled to this system may be decoupled (or, "open-circuited") during the startup sequence to, again, remove the drag and inertia that would need to be overcome to rotate those components. Decoupling the components may also increase the voltage available to drive the turbine-starting components.

Various orders of applying power to the above components during the startup sequence may be used. For example, power may be applied first to the dedicated starter (e.g., ATS or ESG), then a barring motor, and finally the PMA. As another example, power may be applied first to the dedicated starter (e.g., ATS or ESG), then the PMA, and finally a barring motor. As another example, power may be applied first to the PMA, then the dedicated starter (e.g., ATS or ESG), and finally a barring motor. As another example, power may be applied first to the PMA, then a barring motor, and finally the dedicated starter (e.g., ATS or ESG). As another example, power may be applied first to a barring motor, then the PMA, and finally the dedicated starter (e.g., ATS or ESG). As another example, power may be applied first to a barring motor, then the dedicated starter (e.g., ATS or ESG), and finally the PMA. As stated above, any of the above applications of power may overlap, or they may be applied separately from one or more of the other applications of power such that one or more of a pair of applications of power are not applied at the same time.

In accordance with some embodiments, the applications of power may be simultaneously in addition to staggered. For example, power may be applied first and simultaneously to the dedicated starter and a barring motor, and then to the PMA. In some embodiments, power may be applied first and simultaneously to the dedicated starter and the PMA, and then to the barring motor. In some embodiments, power may be applied to the dedicated starter, PMA, and barring motor at the same time.

It should be understood that, in the above embodiments, other accessory components, such as the hydraulic components disclosed below, may also be used in addition to or in place of the above recited barring motor and/or PMA.

In some embodiments, any of the accessory components configured to augment the starting torque of the may be depowered based on the spool speed of the starting turbine. As shown with respect to FIG. 5, the starter torque decreases as the starter increased in RPM. The rotation of the turbine spool is coupled to the rotation of the starter via the gearbox, therefore the starter torque decreases as the spool speed increases. At some point during the startup sequence, the augmenting torque of the one or more accessory components (barring motor, PMA, etc.) is no longer required and this component(s) may be depowered, decoupled, or otherwise unloaded from the accessory gear box. In some embodiments, the spool may reach a speed at which an augmenting component may no longer safely operate. For example, the barring motor may not be configured for high speed rotation. In such an instance, the augmenting component is decoupled from the spool. This decoupling may be actively controlled, or passively controlled, e.g., via a clutch configured to open at a particular rotational speed.

In accordance with some embodiments, the hydraulic system may be used to supplement the starting sequence. For example, the hydraulic system may comprise a mechanically driven hydraulic pump coupled to the gearbox 114, and a system of piping (or conduits) configured to deliver hydraulic fluid to remote components. Within the hydraulic system there may be one or more locations configured to receive a supply of pressurized fluid from an source external to this particular hydraulic system (and, therefore, the external source may be remote from the accessory gear), or a particular section of the hydraulic system. For example, a hydraulic accumulator, starting cart, or the hydraulic system of another engine may be used to supply high pressure hydraulic fluid to the hydraulic system of a currently non-self-sustaining engine. During a startup sequence, the sources of hydraulic pressure may cause a flow of hydraulic fluid to the hydraulic pump, that in turn is rotated by this flow, thereby providing a startup-assisting torque to the gearbox.

FIGS. 6A to 6D illustrate diagrams of the circuit contacts used to power the dedicated starter (ATS or ESG), and augmenting accessory components barring motor, or PMA (or other augmenting component(s)) during the first application of power at contacts 602, 604, and 606, respectively. A closed contact represents a component to which power is applied, whereas no power is applied to a component with an open contact. A person of ordinary skill in the art ("POSA") understands that each circuit comprises a power source and return and/or ground to complete the circuit.

As can be seen in FIG. 6A, all contacts are shut during the first application of power. In FIG. 6B, only contact 602 and 604 are shut during the first application of power. In FIG. 6C, only contact 602 and 606 are shut during the first application of power. Finally, in FIG. 6D, only contact 602 is shut during the first application of power.

While FIGS. 6A-6B are circuit diagrams, a POSA understands that it is not necessarily electric power that applied to the dedicated starter and/or augmenting accessory components. For example, contact 602 may energize a valve that supplies air to an ATS, or contact 606 may open a pathway for a hydraulic fluid flow.

Although examples are illustrated and described herein, embodiments are nevertheless not limited to the details shown, since various modifications and structural changes may be made therein by those of ordinary skill within the scope and range of equivalents of the claims. For example, while various gearboxes and coupling members have been described herein, one of ordinary skill will understand that these components may be modified, moved, or deleted to achieve a particular purpose.

What is claimed is:

1. A method of starting a turbine engine, the turbine engine comprising, a gearbox coupled to a spool of the turbine engine via an output shaft, a dedicated starter coupled to the gearbox via a first input shaft of the gearbox, and an accessory coupled to the gearbox via a second input shaft of the gearbox, wherein a rotation of the output shaft of the gearbox causes a rotation of the spool, and a rotation of each of the dedicated starter and the accessory is coupled to a rotation of the respective input shaft of the gearbox, the method comprising:

applying a first application of power to one of the dedicated starter and accessory, said first application of power causing:
   rotation of the respective input shaft coupled to the dedicated starter or the accessory;
   rotation of the output shaft of the gearbox, wherein said rotation the output shaft is caused by the rotation of the respective input shaft;
   rotation of the turbine engine spool;
applying a second application of power to the other of the accessory and the dedicated starter, wherein said second application of power to the other of the accessory and the dedicated starter causes:
   increased rotational speed of the turbine engine spool beyond that achieved by the first application of power, and
applying a third application of power to a second accessory, said third application of power causing:
   further increased rotational speed of the turbine engine spool beyond that achieved by the first and second applications of power.

2. The method of claim 1, where the second application of power is applied while the first application of power is being applied.

3. The method of claim 1, wherein the dedicated starter is an air turbine starter.

4. The method of claim 1, wherein the accessory is electrically powered by either the first or second application of power.

5. The method of claim 4, wherein the accessory is an alternator.

6. The method of claim 4, wherein the accessory is a barring motor.

7. The method of claim 4, wherein the accessory is a motor-generator.

8. The method of claim 4, wherein said turbine engine further comprises a hydraulic circuit having a mechanically-driven pump rotationally coupled to a shaft of the gearbox, an external hydraulic pressure source located remotely from the gearbox, and a hydraulic fluid conduit coupling a flow of a hydraulic fluid between external hydraulic pressure source and mechanically-driven pump,
   wherein one of the first and second applications of power cause pressurized hydraulic fluid to flow to the mechanically-driven pump, thereby causing rotation of the mechanically-driven pump, a rotation of mechanically driven pump causing rotation of the turbine engine spool through the rotation of the gearbox input and output shafts.

9. The method of claim 1, wherein the accessory is a first accessory, said second accessory coupled to the gearbox via another third input shaft, wherein the rotation of the second accessory is coupled to the rotation of the another the third input shaft of the gearbox.

10. The method of claim 9, wherein the second accessory is an electric starter-generator.

11. The method of claim 1, wherein said first application of power is applied to the dedicated starter.

12. The method of claim 1, wherein said second application of power is applied to the dedicated starter.

13. The method of claim 1, wherein said turbine engine further comprises a plurality of additional mechanically-driven accessories rotationally coupled to the gearbox, each accessory coupled to the gearbox via a clutch.

14. The method of claim 1, wherein said turbine engine further comprises a plurality of electrically-driven accessories selectively electrically coupled to an electrical distribution system.

15. A method of starting a turbine engine, the turbine engine comprising a gearbox coupled to a spool of the turbine engine via an output shaft, a dedicated starter coupled to the gearbox via a first input shaft of the gearbox, and an accessory coupled to the gearbox via a second input shaft of the gearbox, wherein a rotation of the output shaft of the gearbox causes a rotation of the spool, and a rotation of each of the dedicated starter and the accessory is coupled to a rotation of the respective input shaft of the gearbox, the method comprising:
   applying a first application of power to one of the dedicated starter and accessory, said first application of power causing:
      rotation of the respective input shaft coupled to the dedicated starter or the accessory;
      rotation of the output shaft of the gearbox, wherein said rotation the output shaft is caused by the rotation of the respective input shaft;
      rotation of the turbine engine spool;
   applying a second application of power to the other of the accessory and the dedicated starter, wherein said second application of power to the other of the accessory and the dedicated starter causes:
      increased rotational speed of the turbine engine spool beyond that achieved by the first application of power, and
   wherein the second application of power is applied after the first application of power has stopped, wherein the first application of power and the second application of power are applied separately.

16. A method of starting a turbine engine, the turbine engine comprising a gearbox coupled to a spool of the turbine engine via an output shaft, a starter coupled to the gearbox via a first input shaft of the gearbox, and a barring motor coupled to the gearbox via a second input shaft of the gearbox, and an accessory coupled to the gearbox via a third input shaft of the gearbox, wherein a rotation of the output shaft of the gearbox causes a rotation of the spool, and a rotation of each of the starter, the accessory, and the barring motor is coupled to a rotation of its respective input shaft of the gearbox, the method comprising:
   applying a first application of power to the barring motor, said first application of power causing:
      rotation of second input shaft of the gearbox;
      rotation of the output shaft of the gearbox, wherein the rotation the output shaft is caused by the rotation of the second input shaft;
      rotation of the turbine engine spool;
   applying a second application of power to the starter, wherein said second application of power:
      increased rotational speed of the turbine engine spool beyond that achieved by the first application of power; and
   applying a third application of power to the accessory, the third application of power causing:
      further increased rotational speed of the turbine engine spool beyond that achieved by the first application of power and the second applications of power.

17. The method of claim 16, wherein the accessory comprises a permanent magnet alternator coupled to the third input shaft said method further comprising:
   stopping the application of first power to the barring motor prior to the third application of power;

disengaging the barring motor from the first input shaft; and after disengaging the barring motor, applying the third application of power to the permanent magnet alternator, wherein the third application of power occurs during the application of the second application of power.

18. The method of claim 16, wherein said starter is an air turbine starter.

19. The method of claim 16, wherein said starter is an electric starter.

20. A method of starting a turbine engine, the turbine engine comprising a gearbox coupled to a spool of the turbine engine via an output shaft, an air turbine starter coupled to the gearbox via a first input shaft of the gearbox, and a permanent magnet alternator (PMA) coupled to the gearbox via a second input shaft of the gearbox, and an accessory coupled to the gearbox via a third input shaft of the gearbox, wherein a rotation of the output shaft of the gearbox the causes a rotation of the spool, and a rotation of each of the air turbine starter, the accessory, and the PMA is coupled to a rotation of its respective input shaft of the gearbox, the method comprising:

applying a first application of power to the air turbine starter, said first application of power causing:
rotation of first input shaft of the gearbox;
rotation of the output shaft of the gearbox, wherein the rotation the output shaft is caused by the rotation of the first input shaft;
rotation of the turbine engine spool;

applying a second application of power to the PMA, wherein said second application of power:
increased rotational speed of the turbine engine spool beyond that achieved by the first application of power; and applying a third application of power to the accessory, the third application of power causing:
further increased rotational speed of the turbine engine spool beyond that achieved by the first application of power and the second applications of power.

* * * * *